May 29, 1923. 1,456,887
H. KROMBEIN
DRIVE WHEEL CONSTRUCTION FOR TRACTORS
Filed Feb. 7, 1922 2 Sheets-Sheet 1

INVENTOR
Henry Krombein.
BY
ATTORNEY

May 29, 1923.
H. KROMBEIN
DRIVE WHEEL CONSTRUCTION FOR TRACTORS
Filed Feb. 7, 1922
1,456,887
2 Sheets-Sheet 2
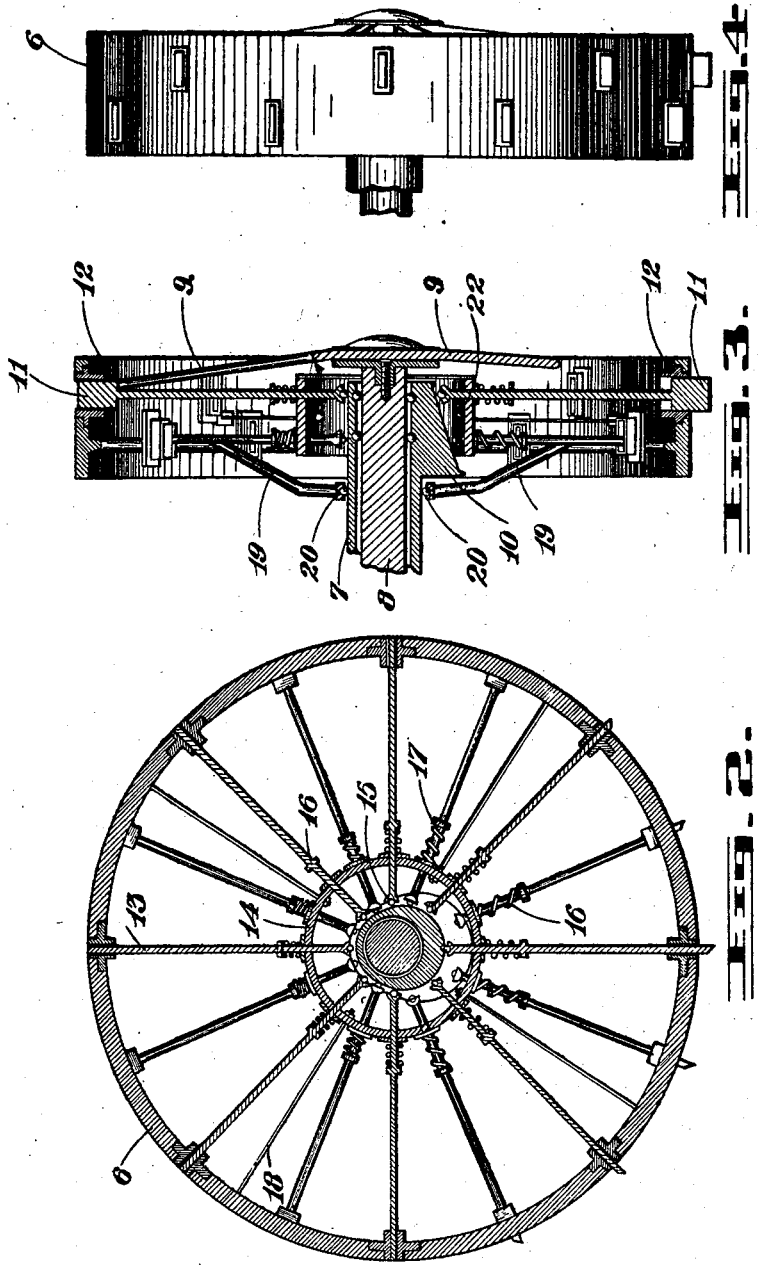
INVENTOR
*Henry Krombein.*
BY
*E. H. Bond*
ATTORNEY Patented May 29, 1923.

1,456,887

UNITED STATES PATENT OFFICE.

HENRY KROMBEIN, OF OAK BANK, MANITOBA, CANADA.

DRIVE-WHEEL CONSTRUCTION FOR TRACTORS.

Application filed February 7, 1922. Serial No. 534,832.

*To all whom it may concern:*

Be it known that I, HENRY KROMBEIN, a citizen of the Dominion of Canada, residing at Oak Bank, in the county of Selkirk and Province of Manitoba, Canada, have invented certain new and useful Improvements in Drive-Wheel Constructions for Tractors, of which the following is a specification.

The present invention relates to improvements in tractor constructions and more particularly refers to the drive wheels of the same.

In the method now in vogue, the drive wheels of tractors which have lugs positioned on their circumferential peripheries functioned to grip the soil, often when on soft ground, become clogged with mud or impedia which prevents the drive wheels from assuming an efficient grip on the surface of the ground.

With this inadequacy in view, I provide a drive wheel construction adapted for use on tractors and which consists in the construction, combination and arrangement of parts as will be hereinafter fully described, illustrated in the accompanying drawings and pointed out in the claims hereunto appended.

Figure 2 is a section through the drive wheel illustrating the construction of the same.

Figure 3 is a vertical cross section of the drive wheel.

Figure 4 is an edge elevation of the same.

Referring to the drawings, like numerals designate like parts in the various drawings.

Figure 1:
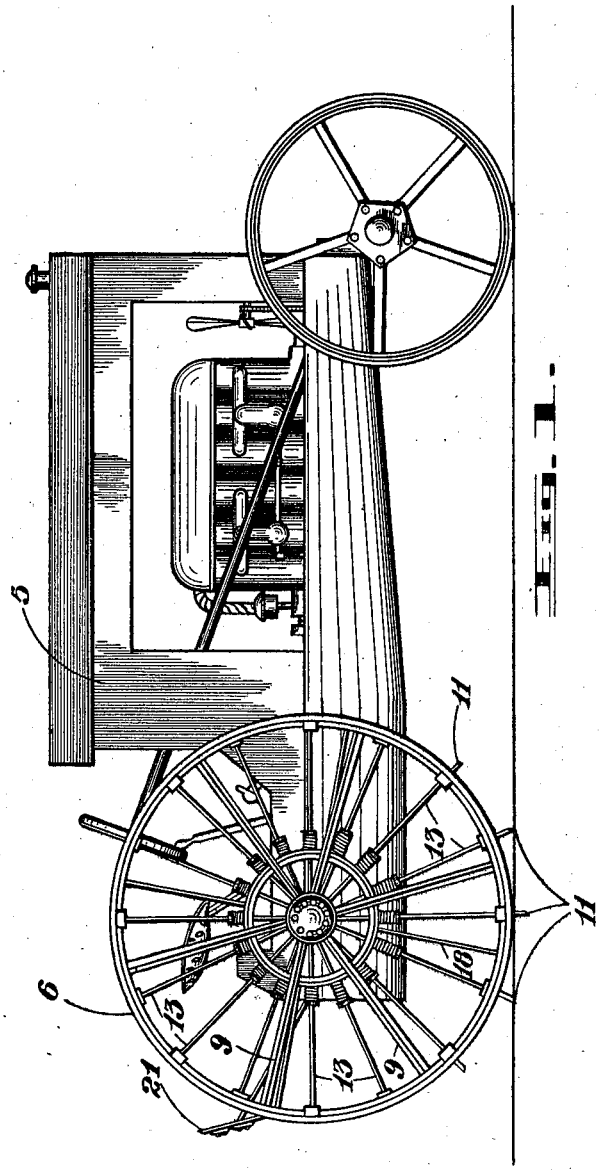
Figure 1 is a side elevation of a tractor embodying my present invention.

The numeral 5 indicates the body of the tractor on which my present invention is embodied. The drive wheel consists of a rim 6, hub 7, drive axle 8 and spokes 9. Referring to Figures 2 and 3, the hub 7 is slidably positioned on the drive axle 8 and restricted from rotation. A projection 10 is configurated on the hub, as indicated diagrammatically and acts as a cam. The projecting lugs 11 are seated at 12 and are positioned on the outer ends of the reciprocal rods 13 which pass through the annular supporting casing 14 and have rollers 15 positioned on their inner ends and bearing against the face of the cam. Coil springs 16 are substantially connected to the annular supporting casing 14 and to the collars 17 on the reciprocal rods 13. These coil springs are functioned to keep the reciprocal rods 13 normally engaged with the face of the cam 10. This casing is supported by a plurality of rods 18 substantially connected to the rim 6 of the wheel and to the annular supporting casing 14. The spokes 9 are suitably connected to the outer end of the axle 8 and to the rim 6 of the wheel. Auxiliary spokes 19, connected to the rim 6 of the wheel, have rollers 20 mounted on their inner ends which bear on the annular portion of the hub 7, as clearly illustrated in Figure 3.

On each revolution of the drive wheel, as the reciprocal rods 13 pass over the cam-shaped hub, it is obvious that the projecting lugs 11 will project through the rim 6 around the lower portion of the rim in relation to the configuration of the cam. As the wheel continues its cycle of revolution, rods 13 recede from the openings through the rim of the wheel 6 until a flat surface on the wheel is resumed.

A suitable scraper illustrated in Figure 1 and indicated by the numeral 21, is functioned to scrape the clinging earth or impedia from the circumferential face of the wheel and it will be readily seen that the projecting lugs 11 will not interfere with the scraping operation.

It is obvious that the face of the cam is tapered, as indicated by the numeral 22. This permits an uneven projection of the reciprocal rods 13. The projection of the reciprocal rods 13 may be adjusted by sliding the hub 7 in the desired direction.

While I have illustrated and described the preferred form of construction of my invention, it will be understood that minor changes in construction, combination and arrangement of parts may be made without departing from the spirit and scope of the appended claims.

From the foregoing, it is thought that the construction of my invention will be clearly understood and, therefore, a more extended explanation has been omitted.

What I claim as new is:

1. A drive wheel construction for tractors comprising in combination with the drive axle of the said tractor, a cam-shaped hub restricted from rotation positioned on the said axle, a rim, spokes supporting the said rim and connected to the said axle, auxiliary spokes connected to the rim of the wheel and at their inner ends carrying rollers bearing on the hub, rods radially disposed from the said cam-shaped hub, rollers on the inner ends of the said rods and bearing against the face of the cam-shaped hub and earth gripping members or projecting lugs positioned on the outer ends of the said rods.

2. A drive wheel construction for tractors comprising in combination with the drive axle of the said tractor, a cam-shaped hub positioned on the said axle, a rim, spokes supporting the said rim and connected to the said axle, auxiliary spokes connected to the rim of the wheel and at their inner ends carrying rollers bearing on the hub, rods radially disposed from the said cam-shaped hub, rollers on the inner ends of the said rods and bearing against the face of the cam-shaped hub, earth gripping members or projecting lugs positioned on the outer ends of the said rods and coil springs on the said rods functioned to keep the same in normal position.

In testimony whereof I affix my signature in the presence of two witnesses.

HENRY KROMBEIN.

Witnesses:
 WILHELMINE MAGNUSSEN,
 MARIE STREICH.